(12) United States Patent
Lu et al.

(10) Patent No.: US 12,174,316 B2
(45) Date of Patent: Dec. 24, 2024

(54) HIGH CONTRAST GRATING FOR HIGHLY REFLECTIVE MEMS SURFACE FOR LiDAR

(71) Applicant: Beijing Voyager Technology Co., Ltd., Beijing (CN)

(72) Inventors: Yue Lu, Mountain View, CA (US); Youmin Wang, Mountain View, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 866 days.

(21) Appl. No.: 17/110,835

(22) Filed: Dec. 3, 2020

(65) Prior Publication Data

US 2022/0179046 A1    Jun. 9, 2022

(51) Int. Cl.
| | | |
|---|---|---|
| *G01S 7/48* | (2006.01) | |
| *G01S 7/481* | (2006.01) | |
| *G01S 7/4865* | (2020.01) | |
| *G01S 17/931* | (2020.01) | |
| *G02B 7/182* | (2021.01) | |
| *G02B 26/08* | (2006.01) | |

(52) U.S. Cl.
CPC ............ *G01S 7/481* (2013.01); *G01S 7/4865* (2013.01); *G01S 17/931* (2020.01); *G02B 7/1821* (2013.01); *G02B 26/0841* (2013.01)

(58) Field of Classification Search
None
See application file for complete search history.

(56) References Cited

U.S. PATENT DOCUMENTS

| | | | | |
|---|---|---|---|---|
| 10,429,588 | B1* | 10/2019 | Yoo .................... | G02B 6/124 |
| 2016/0003996 | A1* | 1/2016 | Dehmlow ............. | G02B 5/203 |
| | | | | 359/566 |
| 2016/0320488 | A1* | 11/2016 | Slobodyanyuk .... | G02B 26/0808 |
| 2018/0364334 | A1* | 12/2018 | Xiang .................. | G01S 17/931 |
| 2019/0162908 | A1* | 5/2019 | Moebius .............. | G02B 6/124 |

FOREIGN PATENT DOCUMENTS

| | | | |
|---|---|---|---|
| CN | 112327310 A * | 2/2021 | |
| EP | 1865336 A1 * | 12/2007 | ............. G01S 17/42 |

* cited by examiner

*Primary Examiner* — Hovhannes Baghdasaryan

(74) *Attorney, Agent, or Firm* — Kilpatrick Townsend & Stockton LLP

(57) ABSTRACT

A grating for a steering mirror of a LiDAR system is made without a metal coating. The grating comprising a plurality of ridges defined by a period. The period has a width that is equal to or less than a wavelength of a laser of the LiDAR system. The ridges can be made of crystalline silicon to form a high-contrast grating.

11 Claims, 10 Drawing Sheets

HIGH CONTRAST GRATING FOR HIGHLY REFLECTIVE MEMS SURFACE FOR LiDAR

CROSS-REFERENCES TO RELATED APPLICATIONS

Not Applicable

BACKGROUND

Light steering typically involves the projection of light in a pre-determined direction to facilitate, for example, the detection and ranging of an object, the illumination and scanning of an object, or the like. Light steering can be used in many different fields of applications including, for example, autonomous vehicles, medical diagnostic devices, etc.

Modern vehicles are often fitted with a suite of environment detection sensors that are designed to detect objects and landscape features around the vehicle in real-time that can be used as a foundation for many present and emerging technologies such as lane change assistance, collision avoidance, and autonomous driving capabilities. Some commonly used sensing systems include optical sensors (e.g., infra-red, cameras, etc.), radio detection and ranging (RADAR) for detecting presence, direction, distance, and speeds of other vehicles or objects, magnetometers (e.g., passive sensing of large ferrous objects, such as trucks, cars, or rail cars), and light detection and ranging (LiDAR).

LiDAR typically uses a pulsed light source and detection system to estimate distances to environmental features (e.g., vehicles, structures, etc.). In some systems, a laser emits a burst of light (e.g., referred to as a laser pulse or pulse). The laser pulse is focused through a lens assembly and a reflection of the pulse off of an object is collected by a receiver. A time-of-flight (TOF) of the pulse can be measured from the time of emission to the time the reflection is received, which may manifest as a single data point. This process can be repeated very rapidly over a desired range (e.g., 360 degrees over a 2D plane for ground-based vehicles, and a 3D region for aircraft) to form a collection of points that are dynamically and continuously updated in real-time, forming a "point cloud." The point cloud data can be used to estimate, for example, a distance, dimension, and location of the object relative to a LiDAR system, often with very high fidelity (e.g., within 5 cm).

The lens assembly can include a steering mirror. The steering mirror is used to aim the laser pulses within the desired range. The steering mirror can be a substrate with a metal coating, wherein the metal coating forms a reflective surface. For example, a substrate can be coated with silver, gold, or aluminum (e.g., based on desired wavelength reflectivity and/or cost). Defects in the metal of the reflective surface can cause hot spots when illuminated by the laser. The hot spots can cause delamination, or separation of the metal coating from the substrate, which can degrade the performance of the reflective surface. For example, the reflective surface is not as smooth after delamination.

Despite the promise that LiDAR and other sensing systems bring to the continued development of fully autonomous transportation, there are challenges that limit its widespread adoption. LiDAR systems are often expensive, large, and bulky. While significant strides have been made to push autonomous vehicle technology to greater commercial adoption, more improvements are needed.

BRIEF SUMMARY

In certain embodiments, a system for beam steering in a Light Detection and Ranging (LiDAR) system of an autonomous vehicle is disclosed. The system can include a laser, a grating, and a detector. The laser emits an optical beam defined by a center wavelength. The laser is configured to emit light toward the grating. The grating is configured to reflect the optical beam and can be used to seer the optical beam by rotating the grating. The grating has multiple ridges separated by trenches. A width of one ridge plus a width of one trench define a width of one period. The width of the period is less than the center wavelength. Light reflected from the grating propagates to an object and is reflected by the object. The detector is configured to detect light from the optical beam after light from the optical beam is reflected from the object.

The system can comprise one or more processors configured to calculate a distance of the object from the system based on a time-of-flight of a pulse of light from the laser to the detector. In some configurations, the ridges are made of crystalline silicon, the trenches are unfilled, such that air separates the plurality of ridges; the plurality of ridges are defined by a first refractive index; the plurality of trenches are defined by a second refractive index; and/or the first refractive index minus the second refractive index is equal to or greater than two.

In certain embodiments, a method for manufacturing a mirror for use in an autonomous vehicle using Light Detection and Ranging (LiDAR) is disclosed. The method comprises obtaining a semiconductor wafer, the semiconductor wafer comprising a device layer, a handle layer, and an insulting layer between the device layer and the handle layer; applying a mask to define a pattern, wherein the pattern is configured to form a grating to reflect an optical beam defined by a center wavelength; etching the device layer through the mask to form a plurality of ridges, wherein: the plurality of ridges have walls defining a plurality of trenches between the plurality of ridges, the plurality of ridges are defined by a period such that a width of one ridge plus a width of one trench is equal to a width of the period, and the width of the period is less than the center wavelength; removing a portion of the handle layer to form an opening in the handle layer; and/or removing a portion of the insulating layer through the opening in the handle layer. The method can further comprise installing the grating in a LiDAR system as a reflector for a laser, wherein a metal coating does not cover a top surface of the grating.

In certain embodiments, a method for Light Detection and Ranging (LiDAR) in an autonomous vehicle is disclosed. The method comprises generating an optical beam, using a laser that is part of a ranging system, wherein the optical beam is defined by a center wavelength; directing the optical beam onto a grating comprising a plurality of ridges, wherein: the grating is part of the ranging system, the plurality of ridges have walls defining a plurality of trenches between the plurality of ridges, the plurality of ridges are defined by a period such that a width of one ridge plus a width of one trench is equal to a width of the period, the width of the period is less than the center wavelength, and the grating is configured to reflect the optical beam; detecting light at the center wavelength, using a detector that is part of the ranging system, after light from the optical beam is reflected from an object; and/or calculating a distance of the object from the ranging system.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The detailed description is set forth with reference to the accompanying figures.

Figure 1:
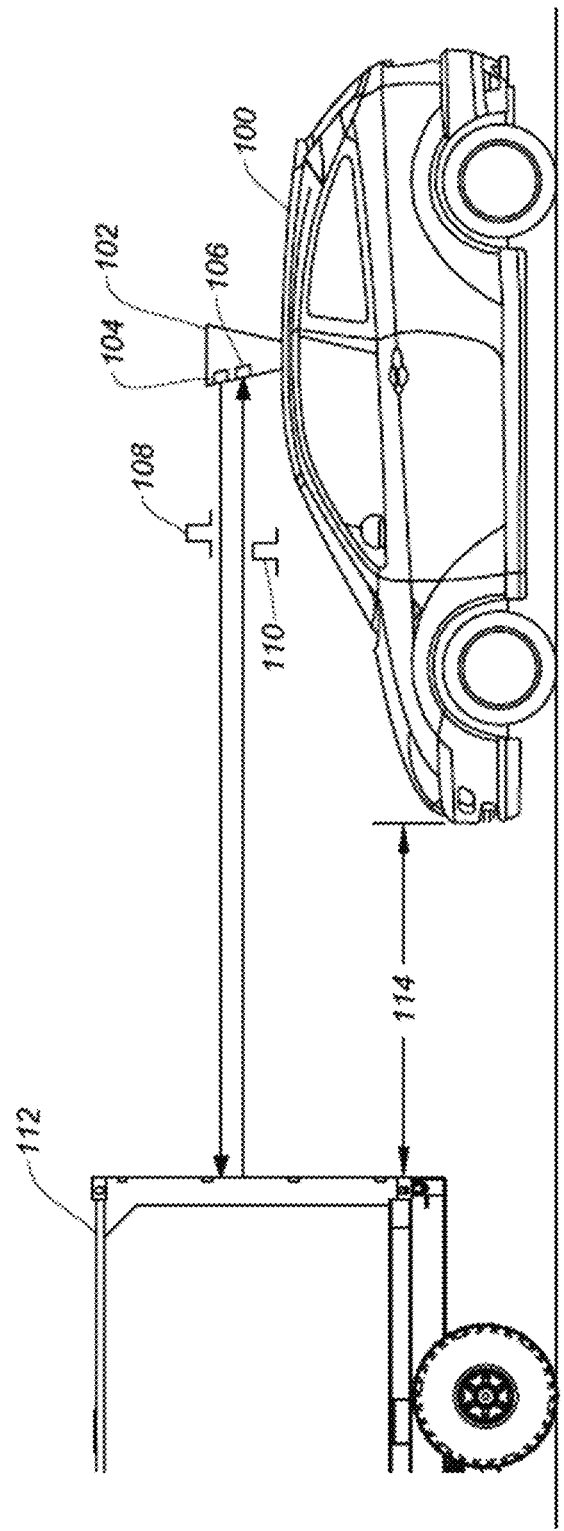
FIG. 1 shows an autonomous driving vehicle utilizing aspects of certain embodiments of disclosed techniques.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Aspects of the present disclosure relate generally to mirrors used for beam steering, and without limitation, to beam steering in a Light Detection and Ranging (LiDAR) system (e.g., for use in a system with an autonomous vehicle). LiDAR often uses a laser to range objects. The laser generates an optical beam. A steering mirror is used to steer the optical beam to measure a distance to an object. Light is reflected from an object, and a detector detects the reflected light. The steering mirror is often metal coated.

One concern about using LiDAR is having the laser that is eye safe. A possible solution to have a laser be eye safe is to use flash LIDAR, where a laser beam diverges at an angle such that the laser beam spreads out so that less power enters a person's pupil. However, with greater beam divergence, laser power is increased so that a detector can better detect reflected light from the object. One potential problem with increased power is damage to metal on the steering mirror. Also, metal on a mirror can generate hot spots, which can cause delamination of the metal. In some configurations, a grating is used for a steering mirror, wherein the grating is not covered by a metal. In some embodiments, the grating is a high-contrast grating made in silicon, wherein the grating has a period that is equal to or less than a center wavelength of light produced by the laser.

A LiDAR system (e.g., for an autonomous vehicle or as an aid to a vehicle operated by a person) may include a laser, a steering mirror, and a detector. The laser emits an optical beam. The optical beam is defined by a center wavelength. The LiDAR can be a flash LiDAR system, such that the optical beam is allowed to diverge instead of being collimated. Power of the laser in the flash LiDAR system can exceed the damage threshold of various metals used as reflective surfaces for a steering mirror. For example, intensity per pulse of the laser can exceed 0.3, 0.4, 1.0, 1.2, 1.5, 1.8, 2.0, 2.2, or 2.4 J/cm². The steering mirror is formed by etching a semiconductor to form ridges, with trenches separating the ridges. A period of the grating is equal to or less than the center wavelength. The grating reflects the optical beam. The grating does not have a metallic surface coating. The detector receives light from the laser reflected from an object. A distance to the object can be calculated by calculating a time it takes for the laser to transmit a pulse to the detector receiving light from the pulse. In some configurations, the grating is formed concurrently with forming other MEMS features (e.g., one or more motors). By not applying a metal coating to the steering mirror, processing the steering mirror takes less processing steps.

In some examples, a process may include obtaining a semiconductor wafer, applying a mask to define a pattern, wherein the pattern is configured to form a grating to reflect an optical beam defined by a center wavelength; etching semiconductor wafer through the mask to form a plurality of ridges, wherein a width of the period of the grating is less than the center wavelength; and installing the grating in a LiDAR system as a reflector for a laser.

In some examples, a process for Light Detection and Ranging (LiDAR) in an autonomous vehicle may include, generating an optical beam, using a laser that is part of a ranging system, wherein the optical beam is defined by a center wavelength; directing the optical beam onto a grating comprising a plurality of ridges, wherein a width of the period of the grating is less than the center wavelength; detecting light at the center wavelength, using a detector that is part of the ranging system, after light from the optical beam is reflected from an object; and calculating a distance of the object from the ranging system.

In the following description, various examples of a mirror (e.g., a grating mirror for a LiDAR system) will be described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

FIG. 1 illustrates an embodiment of an autonomous vehicle 100 in which the disclosed techniques can be implemented. The autonomous vehicle 100 includes a LiDAR module 102. LiDAR module 102 allows the autonomous vehicle 100 to perform object detection and ranging in a surrounding environment. Based on results of object detection and ranging, the autonomous vehicle 100 can maneuver to avoid a collision with objects. The LiDAR module 102 can include a transmitter 104 and a receiver 106 for light steering. The transmitter 104 can project one or more light pulses 108 at various directions at different times in a scanning pattern, while receiver 106 can monitor for a light pulse 110 which is generated by the reflection of light pulse 108 by an object. LiDAR module 102 can detect the object based on the reception of light pulse 110, and can perform a ranging determination (e.g., a distance of the object) based on a time difference between light pulses 108 and 110 and/or based on phase difference between light pulses 108 and 110.

For example, as shown in FIG. 1, the LiDAR module 102 can transmit light pulse 108 at a direction directly in front of autonomous vehicle 100 at time T1 and receive light pulse 110 reflected by an object 112 (e.g., another vehicle) at time T2. Based on the reception of light pulse 110, LiDAR module 102 can determine that object 112 is directly in front of autonomous vehicle 100. Moreover, based on the time difference between T1 and T2, LiDAR module 102 can also determine a distance 114 between autonomous vehicle 100 and object 112. The autonomous vehicle 100 can adjust its speed (e.g., slowing or stopping) to avoid collision with object 112 based on the detection and ranging of object 112 by LiDAR module 102.

Figure 2:
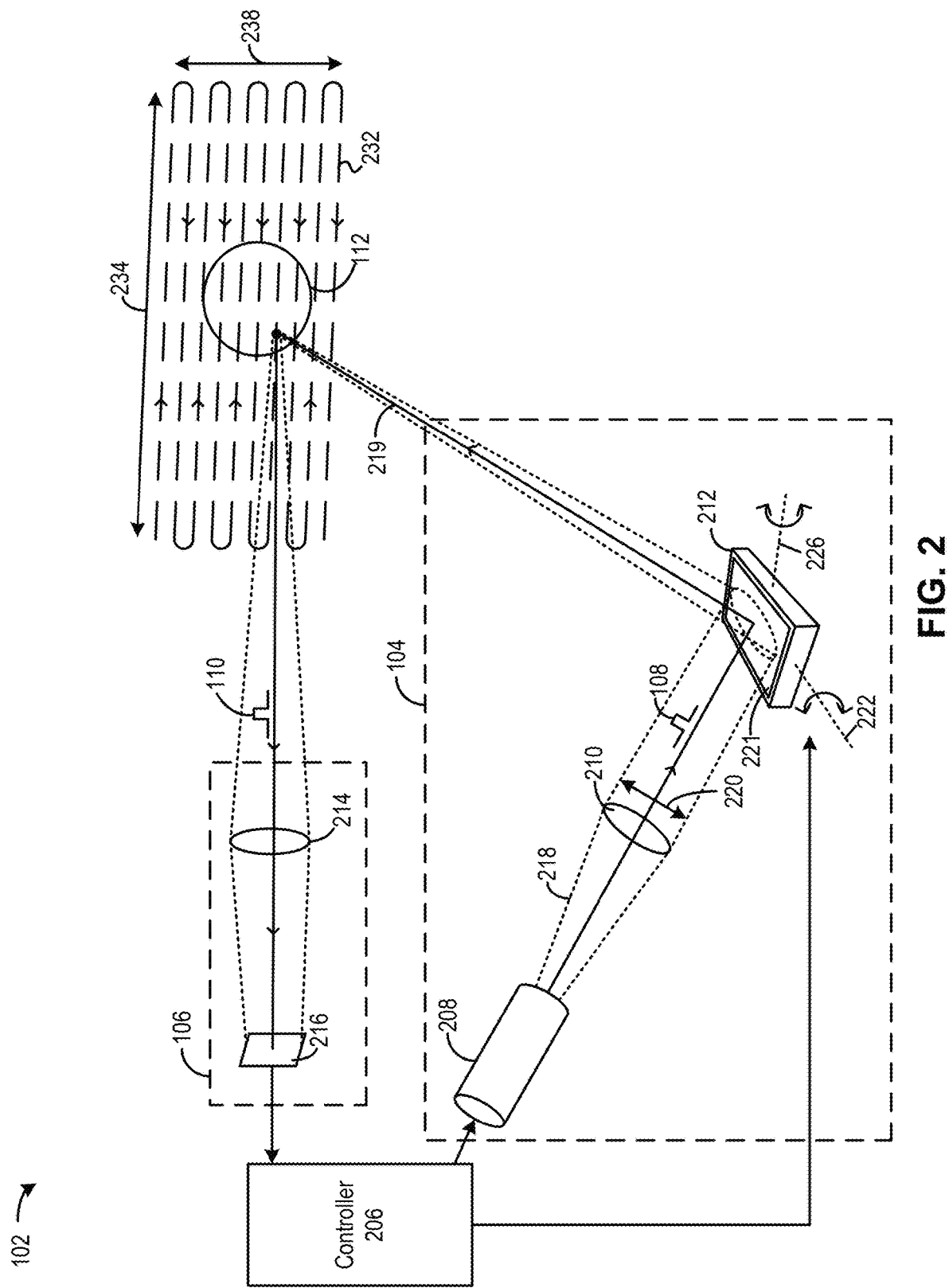
FIG. 2 illustrates an example of a light steering transmitter, according to certain embodiments.

FIG. 2 illustrates an example of internal components of a LiDAR module 102. LiDAR module 102 includes the transmitter 104, the receiver 106, and a controller 206, which controls the operations of the transmitter 104 and the receiver 106. Transmitter 104 includes a light source 208, a lens 210, and a mirror assembly 212. The light source 208 is configured to generate light pulses 108. In some embodiments, the light source 208 is a laser (e.g., laser diode, solid-state laser, etc.). The lens 210 is a collimator lens configured to collimate light emitted from the light source 208. The receiver 106 comprises a lens 214 and a detector 216 (e.g., a photodetector). The lens 214 is configured to focus light from light pulses 110 onto the detector 216.

The controller 206 can control the light source 208 to transmit light pulse 108, which is part of an optical beam 218. The optical beam 218 can diverge upon leaving the light source 208. The optical beam 218 is collimated by passing through lens 210. Lens 210 has an aperture width (e.g., diameter of lens 210), which can set a beam width 220 of collimated light incident on the mirror assembly 212.

The optical beam 218 is reflected by the mirror assembly 212 and steered by the mirror assembly 212 along a projection path 219 towards the object 112. The mirror assembly 212 includes one or more mirrors 221, which is rotatable. FIG. 2 illustrates the mirror assembly 212 having one mirror 221, but as to be described below, in some embodiments the mirror assembly 212 includes a plurality of mirrors. To reduce loss of light, the mirror 221 can have a length (and/or width) that matches the beam width 220. Such an arrangement can enable the mirror assembly 212 to reflect and project a larger portion of light and to mitigate dispersion.

The mirror assembly 212 further includes one or more actuators to rotate the mirror 221. The actuators can rotate mirror 221 about a first axis 222, and about a second axis 226. Rotation about the first axis 222 can change a first angle of the projection path 219 and rotation about the second axis 226 can change a second angle of the projection path 219. The controller 206 can control the actuators to produce different combinations of angles of rotation around the first axis 222 and the second axis 226 such that the movement of the projection path 219 can follow a scanning pattern 232. The scanning pattern has a first range 234 (e.g., horizontal) and a second range 238 (e.g., vertical). The first range 234 and the second range 238 define a field of view (FOV) of the transmitter 104. Light from the optical beam 218 reflects from an object within the FOV, such as object 112, to form light pulse 110, which is a reflected pulse. The light pulse 110 is detected by the receiver 106.

Figure 3:
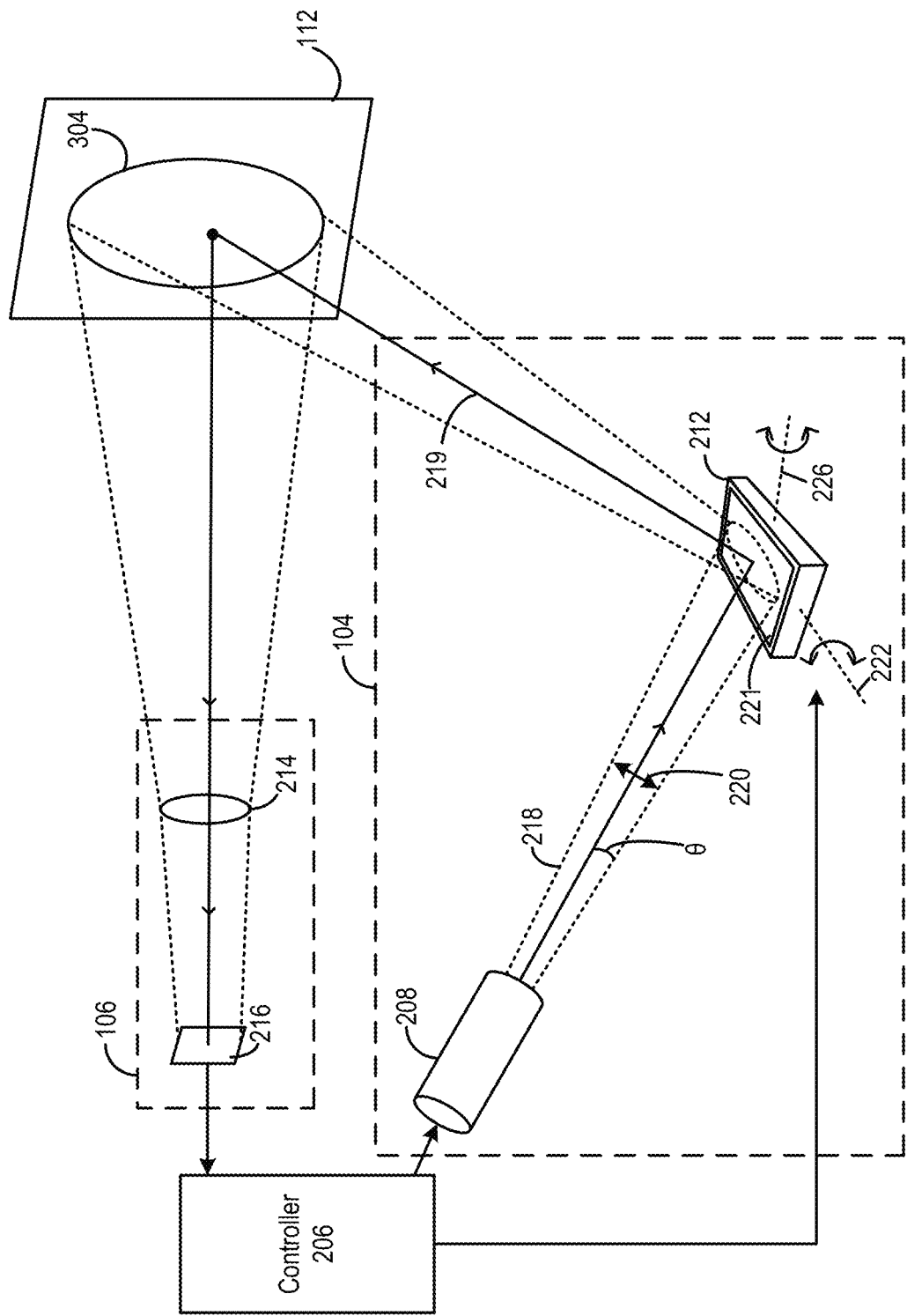
FIG. 3 illustrates an example of flash LiDAR, according to certain embodiments.

FIG. 3 illustrates an example of a flash LiDAR module, according to certain embodiments. The flash LiDAR module comprises a transmitter 104 and a receiver 106. The transmitter 104 comprises a light source 208 and a mirror assembly 212. The receiver 106 comprises a lens 214 and a detector 216. In some embodiments, the flash LiDAR module comprises a controller 206. The mirror assembly 212 can receive signals from the controller 206 to move a mirror 221 of the mirror assembly (e.g., by rotating the mirror 221 about the first axis 222 and/or the second axis 226).

The light source 208, e.g., a laser, emits light defined by a center wavelength. For example, a Nd:YAG laser is used having a center wavelength at 1064 nm and a bandwidth, measured at full-width, half-max, of 20 nm. In another example, a laser diode is used as the light source 208. In some embodiments, a center wavelength equal to or greater than 800 nm and/or equal to or less than 1650 nm is used (e.g., a center wavelength of 905 nm or 1550 nm). The light source 208 produces optical beam 218. The optical beam 218 is pulsed. The optical beam has a beam width 220, which diverges from a beam waist approximated by a divergence angle θ.

The optical beam 218 is directed to reflect off the mirror 221 and proceed along projection path 219. The optical beam 218 forms a spot size 304 on an object 112. The spot size 304 on the object 112 is dependent on the divergence angle θ and how far the object 112 is from the light source 208.

Reflected light from the object 112 is received by the detector 216 (e.g., after being focused by lens 214). A distance from the flash LiDAR module to the object 112 can be calculated (e.g., based on a time-of-flight of an optical pulse from the light source 208 to the detector 216).

One possible concern about using LiDAR is having a laser that is eye safe. In some embodiments, the optical beam 218 is allowed to diverge (e.g., at the divergence angle θ) in the embodiment shown in FIG. 3 (e.g., instead of being collimated by lens 210 as shown in FIG. 2). By allowing the optical beam 218 to diverge, the flash LiDAR module can be considered eye safe at closer distances than the LiDAR module 102 shown in FIG. 2, even with increased laser energy because a smaller percentage of energy enters a pupil. In certain embodiments, the divergence angle θ is equal to or greater than 1, 1.5, 2, 3, or 5 degrees and/or equal to or less than 2.5, 5, 7.5, 10, or 15 degrees. For example, a divergence angle θ of 2 degrees produces a spot size 304 having a width of 3.5 centimeters at a distance of 1 meter from the light source 208. A spot size of 3.5 cm is considered large compared to a size of a human pupil since a significant percentage (e.g., less than 10, 20, 25, 30, or 50%) of the optical beam 218 would not enter the human pupil. The divergence angle θ can be designed to be large enough to benefit eye safety and not larger than a vertical field of view of a LiDAR system.

The light source 208 of the flash LiDAR module in FIG. 3, in some configurations, uses higher energy than the LiDAR module 102 in FIG. 2. The optical beam 218 in FIG. 3 has higher divergence than the optical beam 218 in FIG. 2. With higher divergence, there is less brightness (e.g., radiance, wherein radiance is optical power per unit area per solid angle) on the object 112. Less brightness on the object 112 can reduce an amount of light received by the detector 216. Based on sensitivity of the detector 216, energy of the light source 208 is increased to increase an amount of reflected light received by the detector 216 (e.g., to increase an effective range of the flash LiDAR module to range the object 112). As energy per laser pulse is increased, power is increased (e.g., if pulse duration is kept constant). In some embodiments, energy of the light source 208 is increased so the flash LiDAR module can range an object at a distance equal to or greater than 30, 40, 50, 75, 100, or 150 meters and/or equal to or less than 50, 75, 100, 200, 300, or 500 meters. For example, the flash LiDAR module can range an object within 50 or 100 meters.

Figure 4:
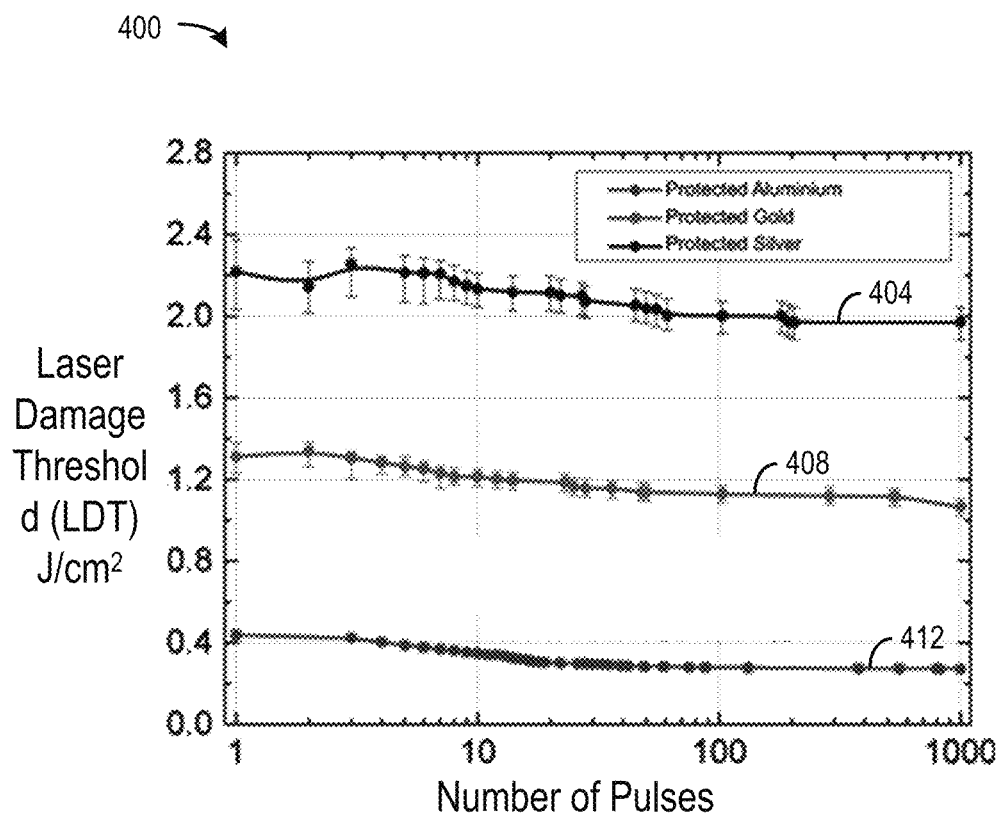
FIG. 4 shows a graph of damage threshold of possible metals used as a reflective surface.

The mirror 221 in FIG. 2 can be formed by using a metal coating. FIG. 4 shows a graph 400 of damage thresholds of several metals used as reflective surfaces for a mirror. For example, gold, silver, or aluminum can be deposited on a material (e.g., glass, crystal, semiconductor, silicon, GaAs, InP) to form a reflective surface of the mirror 221 in FIG. 2. A thickness of metal can range from a few nanometers to tens or hundreds of nanometers (e.g., 5, 10, 50, 100, 200, 300 nm or more).

The graph 400 illustrates laser damage threshold (LDT) in Jules per centimeter squared for gold, silver, and aluminum coatings as a function of number of pulses. A first trend line 404 illustrates the laser damage threshold for silver. A second trend line 408 shows the laser damage threshold for gold. A third trend line 412 shows the laser damage threshold for aluminum. Data for graph 400 was obtained using a laser having a center wavelength of 1064 nm, a pulse duration of 11 ns, a repetition rate of 50 Hz, and an angle of impact of 0 degrees. The beam diameter of the laser (measured at $1/e^2$) was 147 microns, plus or minus 7 microns, for gold and aluminum, and 150 microns, plus or minus 8 microns, for silver.

As seen in graph 400, the laser damage threshold for silver is around 2 $J/cm^2$; the laser damage threshold for gold is around 1 $J/cm^2$, and the laser damage threshold for aluminum is around 0.3 $J/cm^2$. Increasing power for the flash LiDAR module of FIG. 3 increases the burden on the mirror 221 in FIG. 2, and power can exceed the laser damage threshold for the metals shown in graph 400. Additionally, metal coatings can have hot spots (e.g., areas that heat up due to quality defects) that can cause delamination of the metal coating in an area. By not having a metal coating (e.g., using one material), hot spots are reduced or avoided.

Figure 5:
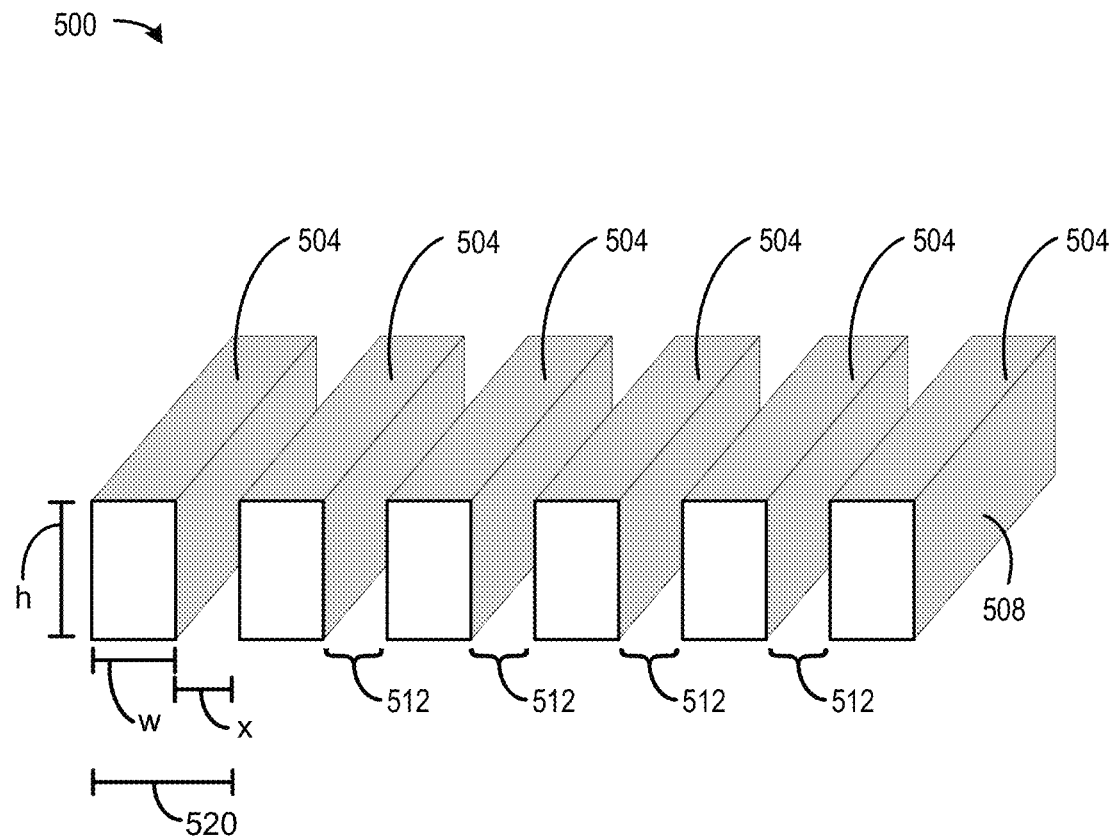
FIG. 5 depicts a simplified perspective view of an embodiment of a high-contrast grating.

In some configurations, a metal coating is not used for the mirror 221 in FIG. 3 so that laser power can be increased (e.g., beyond the laser damage threshold of metal coatings). In some embodiments, a high-contrast grating is used, without a metal coating, as a mirror 221. FIG. 5 depicts a simplified perspective view of an embodiment of a grating 500. The grating comprises a plurality of ridges 504. The plurality of ridges 504 have walls 508 defining a plurality of trenches 512 between the plurality of ridges 504. Ridges 504 have a height h (e.g., height of wall 508).

The grating 500 is configured to reflect light from the light source 208. Spacing of the plurality of ridges is defined by a period 520. The period 520 is equal to a width w of one ridge 504 plus a width x of one trench 512. The width of the period 520 is less than a center wavelength of the light source 208 and/or greater than one-fourth, one-fifth, one-sixth, one-seventh, or one-eighth of the center wavelength. For example, a period of 300 nm is used for a center wavelength of 1550 nm (e.g., for C band optical transmission). In some embodiments, the width of the period 520 divided by the center wavelength of the light source is an irrational number (e.g., based on the grating design). Duty cycle is the ratio of the width w of one ridge to the period 520.

The grating 500 is a high-contrast grating, in that a refractive index of the ridge 504 minus a refractive index of the trench 512 is equal to or greater than 2.0, 2.1, or 2.25 and/or equal to or less than 2.7. For example, the ridges 504 are made of silicon (e.g., crystalline silicon, index=3.48 at 1550 nm) and the trenches are unfilled (e.g., air, index=1) for a refractive index difference of 2.48. The greater the refractive-index difference, the greater the reflectivity. Crystalline silicon is used to achieve a highly-reflective material because crystalline silicon has a high refractive index. In some embodiments, silicon dioxide ($SiO_2$) or silicon nitride (SiN), having a refractive index between 1.4 and 2.3, is used (e.g., for 905 nm light).

In designing the grating 500, the period 520, the duty cycle, the height h, the refractive of the ridge 504, and/or the refractive index of the trench 512 can be altered to achieve high reflectivity for a given wavelength, without using a metal covering. High reflectivity is equal to or greater than 80%, 90%, 95%, or 98%. For example, the grating 500 can be designed to achieve 95% or 99% reflectivity. In some embodiments, for 1550 nm light, the period 520 is equal to or greater than 300 nm and/or equal to or less than 650 nm (e.g., 480, 500, 520, or 550 nm); and/or the height h is equal to or greater than 150 nm and/or equal to or less than 500 nm (e.g., 200, 300, or 400 nm).

FIGS. 6-10 depict stages of an embodiment of a process for forming a grating (e.g., for forming grating 500 in FIG. 5). The process uses a dry reactive ion etch (DRIE). DRIE can be used to form other structures at the same time as forming the grating. For example, U.S. Pat. No. 10,509,198, issued on Dec. 17, 2019, and which is incorporated by reference for all purposes, describes a MEMS combdrive actuator with a lever. The grating could be formed concurrently with forming combdrive features and/or the lever (e.g., made in the same etching step as forming combdrive features, thus saving addition mask/process costs). The process, in some embodiments, does not use a metal coating. A metal coating adds additional material and processing costs, and a metal coating can have hot spots, which can cause delamination. However, in some embodiments, a metal coating is used. For example, in some applications a metal coating (e.g., gold, aluminum, or silver) could be used for additional performance improvement, such as for 905 nm light with a grating formed from a dielectric (e.g., $SiO_2$, SiN, TiO, etc), though in other applications a dielectric grating is used that doesn't have a metal coating.

Figure 6:
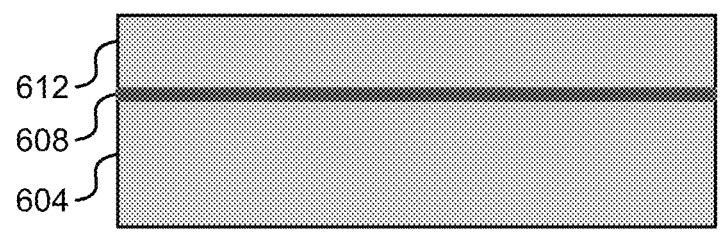
FIG. 6 shows a simplified diagram of a cross section of an embodiment of a semiconductor wafer.

FIG. 6 shows a simplified diagram of a cross section of an embodiment of a wafer 600. The wafer 600 is a semiconductor wafer. The wafer in the embodiment shown is a silicon-on-insulator (SOI) wafer having a substrate 604 (e.g., a handle layer), an insulating layer 608 (e.g., a buried-oxide layer, such as silicon dioxide), and a device layer 612 (e.g., single-crystal silicon), wherein the insulating layer 608 is between the device layer 612 and the substrate 604. Though an SOI wafer is shown, other materials could be used.

Figure 7:
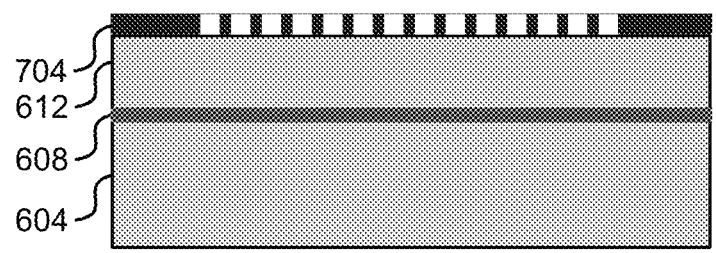
FIG. 7 shows an embodiment of a mask applied to the semiconductor wafer.

FIG. 7 shows an embodiment of a mask 704 applied to the semiconductor wafer. A pattern is defined in the mask 704. The mask can be a photoresist, either positive or negative. The photoresist can be exposed to light (e.g., ultraviolet light) to either make the photoresist where exposed more susceptible to being removed by a developer (e.g., a positive photoresist), or exposure to the light can make the photoresist less susceptible to being removed by a developer (e.g., a negative photoresist; the resist could become polymerized by ultraviolet light). Portions of the photoresist can be removed. For example, a reactive ion etch can be used to remove parts of the photoresist to form the pattern in the mask. The pattern is configured for forming a grating to reflect light at a given wavelength. Openings in the mask 704 are configured to define the duty cycle and widths of ridges of a grating. For example, widths of openings in the mask 704 define a width of a trench, and spacing between openings define widths of ridges. In some embodiments, a metal is applied before the mask 704 is applied to the semiconductor wafer. Portions of the metal will then be removed during a later etch step using the mask 704 before etching the semiconductor wafer (e.g., using the same mask 704 for etching the semiconductor wafer).

Figure 8:
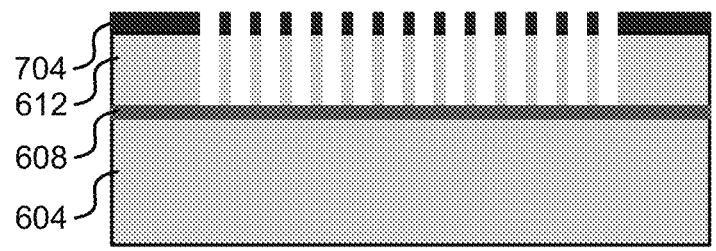
FIG. 8 depicts an embodiment of the wafer etched through the mask to form a grating.

FIG. 8 depicts an embodiment of the wafer etched through the mask 704 to form the grating. The device layer 612 is etched to form a plurality ridges (e.g., the plurality of ridges 504 in FIG. 5). For example, a deep reactive ion etch is used to etch a depth equal to the height h of walls 508 in FIG. 5. Deep reactive-ion etching can be used to create deep trenches with steep sides. The Bosch process, a type of deep reactive-ion etching, uses alternating modes to create a deep etch. The first mode is a plasma etch. The plasma contains ions that attack a surface of a material. The second mode is deposition of a passivation layer. The passivation layer helps protects walls of ridges while a trench is being etched. In some configurations, the height h of the walls 508 is equal to or greater than 200, 300, or 400 nm and/or equal to or less than 450, 500, or 600 nm.

Figure 9:
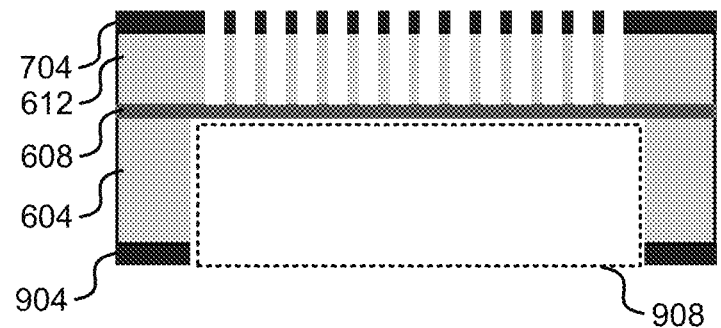
FIG. 9 shows an embodiment of removing a portion of a handle layer of the semiconductor wafer.

FIG. 9 shows an embodiment of removing a portion of a handle layer of the semiconductor wafer. The wafer is flipped and a photoresist 904 is applied to the substrate 604. A portion of the substrate 604 is removed by etching between the photoresist 904. Etching the substrate 604 forms walls in the substrate 604 that define an opening 908 in the substrate 604. For example, a deep reactive-ion etch can be used.

Figure 10:
FIG. 10 depicts an embodiment of removing a portion of an insulating layer of the semiconductor wafer.

FIG. 10 depicts an embodiment of removing a portion of an insulating layer of the semiconductor wafer. The mask is removed and a portion of the insulating layer 608 is removed (e.g., by an oxide etch) to release a structure in the device layer 612. The structure includes the grating. The structure can also include other features formed in the device layer. In some embodiments, a metal coating is added after the mask is removed and/or before the insulating layer 608 is removed.

Figure 11:
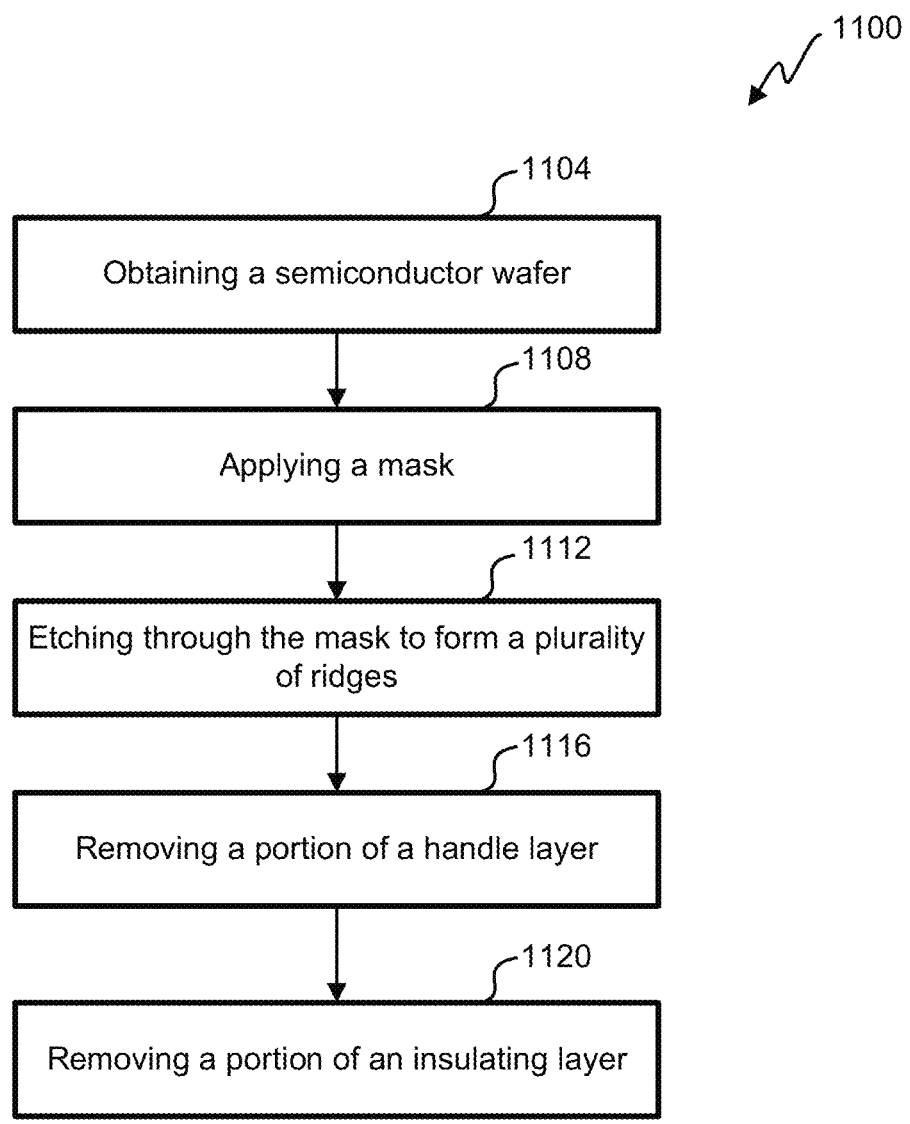
FIG. 11 illustrates a flowchart of an embodiment of a method for manufacturing a high-contrast grating.

FIG. 11 illustrates a flowchart of an embodiment of a method 1100 for manufacturing a high-contrast grating. The high-contrast grating can be for a mirror of a LiDAR system for use in an autonomous vehicle. Method 1100 begins in step 1104 with obtaining a semiconductor wafer, wherein the semiconductor wafer comprising a device layer, a handle layer, and an insulting layer between the device layer and the handle layer (e.g., obtaining wafer 600 and FIG. 6).

In step 1108, a mask is applied to the semiconductor wafer to define a patter. The pattern is configured for forming a grating (e.g., applying the mask 704 in FIG. 7). The grating is configured to reflect an optical beam defined by a center wavelength.

The device layer is etched through the mask to form a plurality of ridges (e.g., etching the device layer 612 in FIG. 8), step 1112. The plurality of ridges have walls defining a plurality of trenches between the plurality of ridges (e.g., as described in FIG. 5). The plurality of ridges are defined by a period such that a width of one ridge plus a width of one trench is equal to a width of the period. The width of the period is less than the center wavelength.

A portion of the handle layer is removed to form an opening in the handle layer, step 1116. For example, a portion of the substrate 604 is removed to form the opening 908 in FIG. 9. In step 1120, a portion of the insulating layer is removed through the opening of the handle layer (e.g., to remove a structure comprising the grating). In some embodiments, the grating is then installed in a LiDAR system as a reflector (e.g., a steering mirror) for a laser.

The grating is not covered with metal. For example, a top surface of the device layer 612 in FIG. 10 is not covered by a metal coating. By not covering the grating with a metal, the process of forming the grating 500 in FIG. 5 is simpler than forming a reflector having a metal coating. Since there is not a metal coating, delamination (e.g., caused by hot spots in the metal) is not a concern. Further, higher laser power can be used because there is no metal to be damaged by higher laser power.

Figure 12:
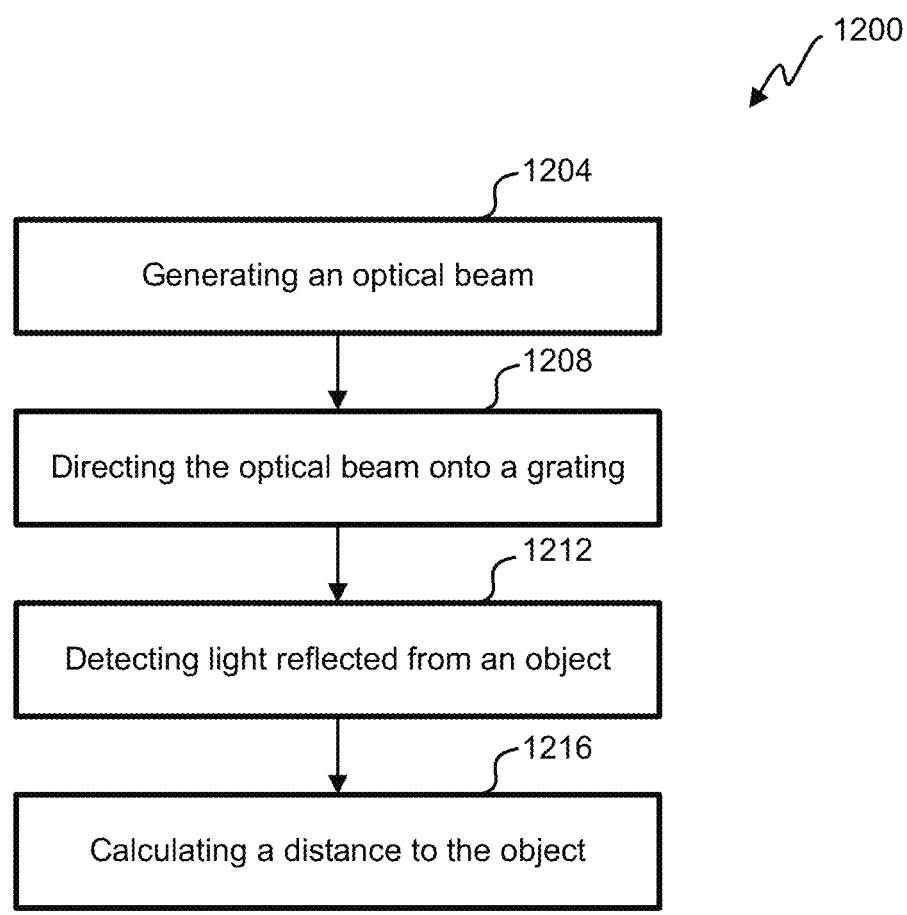
FIG. 12 illustrates a flowchart of an embodiment of a method of using a high-contrast grating in a LiDAR system.

FIG. 12 illustrates a flowchart of an embodiment of a process 1200 of using a high-contrast grating in a LiDAR system. Process 1200 begins in step 1204 with generating an optical beam, using a laser that is part of a ranging system, wherein the optical beam is defined by a center wavelength. For example, a laser as part of the light source 208 in FIG. 3 generates an optical beam of laser pulses having a center wavelength at 1064 nm. A ranging system calculates a range (e.g., a distance) from the system to an object.

In step 1208, the optical beam is directed onto a grating (e.g., grating 500 in FIG. 5). The grating comprising a plurality of ridges. The grating is part of the ranging system (LiDAR is a type of ranging system). The plurality of ridges have walls defining a plurality of trenches between the plurality of ridges (e.g., walls 508 define trenches 512 in FIG. 5). The plurality of ridges are defined by a period such that a width of one ridge plus a width of one trench is equal to a width of the period. The width of the period is less than the center wavelength. For example, if the laser has a center wavelength of 1064 nm, then the period of the grating has a width less than 1064 nm. The grating is configured to reflect the optical beam. For example, the grating is part of the mirror 221 in FIG. 3.

The mirror is configured to reflect light toward an object. Light is reflected by an object and detected by a detector that is part of the ranging system, step 1212. For example, the detector 216 detects light reflected from object 112 in FIG. 3. In step 1216, a distance from the object to the ranging system is calculated. For example a time of flight of light from a laser to a detector of the LiDAR system is measured, and the distance to the object is calculated based on the time of flight.

The mirror of the ranging system can be static. For example, an optical beam is directed to a front of a car for object detection and/or avoidance. If the ranging system detects an object within 20 meters of the front of the car, then the driver could be alerted or automatic evasive action can be triggered (e.g., applying the brakes of the car, depending on the speed of the car). In some configurations, the mirror (which has the high-contrast grating) is moved to direct the laser beam (e.g., to scan an area or volume).

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A system for Light Detection and Ranging (LiDAR) in an autonomous vehicle, the system comprising: a laser, wherein the laser emits an optical beam defined by a center wavelength;
a rotatable non-metallic steering grating configured to rotate about two axes and reflect and steer the optical beam by rotating the steering grating, the steering grating comprising a high contrast grating comprising a plurality of ridges, wherein:
the plurality of ridges have walls defining a plurality of trenches between the plurality of ridges; the plurality of ridges are defined by a period such that a width of one ridge plus a width of one trench is equal to a width of the period;
the width of the period is equal to or less than the center wavelength; and the grating is configured to reflect the optical beam; and a detector configured to detect light from the optical beam after light from the optical beam is reflected from an object.

2. The system of claim 1, further comprising one or more processors configured to calculate a distance of the object from the system based on a time-of-flight of a pulse of light from the laser to the detector.

3. The system of claim 1, wherein the plurality of ridges are made of crystalline silicon.

4. The system of claim 1, wherein the plurality of trenches are unfilled, such that air separates the plurality of ridges.

5. The system of claim 1, wherein:
the plurality of ridges are defined by a first refractive index;
the plurality of trenches are defined by a second refractive index; and
the first refractive index minus the second refractive index is equal to or greater than 2.

6. The system of claim 1, wherein the optical beam has an intensity, per pulse, equal to or greater than 2.4 Joules per square centimeter.

7. The system of claim 1, wherein the ridges have a height equal to or greater than 400 nm and equal to or less than 600 nm.

8. A method for Light Detection and Ranging (LiDAR) in an autonomous vehicle, the method comprising:
generating an optical beam, using a laser that is part of a ranging system, wherein the optical beam is defined by a center wavelength;
directing the optical beam onto a rotatable steering non-metallic high contrast grating;
rotating about two axes the steering non-metallic high contrast grating to scan the optical beam by reflecting the optical beam with a grating comprising a plurality of ridges, wherein:
the grating is part of the ranging system;
the plurality of ridges have walls defining a plurality of trenches between the plurality of ridges;
the plurality of ridges are defined by a period such that a width of one ridge plus a width of one trench is equal to a width of the period;
the width of the period is equal to or less than the center wavelength; and
the grating is configured to reflect the optical beam;
detecting light at the center wavelength, using a detector that is part of the ranging system, after light from the optical beam is reflected from an object; and
calculating a distance of the object from the ranging system.

9. The method of claim 8, wherein the optical beam is characterized by a divergence angle equal to or greater than 1.5 degrees and equal to or less than 7.5 degrees.

10. The method of claim 8, wherein the plurality of trenches are unfilled, such that air separates the plurality of ridges.

11. The method of claim 8, wherein the optical beam has an intensity, per pulse, equal to or greater than 2.4 Joules per square centimeter.

* * * * *